(12) United States Patent
Bryant et al.

(10) Patent No.: US 12,056,112 B2
(45) Date of Patent: *Aug. 6, 2024

(54) DATA FEED META DETAIL CATEGORIZATION FOR CONFIDENCE

(71) Applicant: Bank of America Corporation, Charlotte, NC (US)

(72) Inventors: Matthew Kristofer Bryant, Mount Holly, NC (US); Colin Murphy, Charlotte, NC (US); Dustin Stocks, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,646

(22) Filed: May 28, 2021

(65) Prior Publication Data
US 2022/0382737 A1    Dec. 1, 2022

(51) Int. Cl.
*G06F 16/23*    (2019.01)
*G06F 16/215*    (2019.01)
(Continued)

(52) U.S. Cl.
CPC ........ *G06F 16/2365* (2019.01); *G06F 16/215* (2019.01); *G06F 16/285* (2019.01); *G06N 20/00* (2019.01)

(58) Field of Classification Search
CPC .. G06F 16/2365; G06F 16/215; G06F 16/285; G06F 11/0784; G06F 11/0775; G06F 11/0751; G06F 16/25; G06N 20/00
See application file for complete search history.

(56) References Cited

U.S. PATENT DOCUMENTS

| 5,313,629 A | 5/1994 | Abraham et al. |
| 5,649,116 A * | 7/1997 | McCoy ............... G07F 7/08 |
| | | 705/38 |

(Continued)

OTHER PUBLICATIONS

Sep. 6, 2022—U.S. Non-Final Office Action—U.S. Appl. No. 17/334,659.

(Continued)

*Primary Examiner* — Kris E Mackes
*Assistant Examiner* — Cecile H Vo
(74) *Attorney, Agent, or Firm* — Banner & Witcoff, Ltd.

(57) ABSTRACT

Aspects of the disclosure relate to data feed meta detail categorization for confidence. A computing platform may retrieve source data from a source system and identify a first set of patterns associated with the source data. The computing platform may retrieve, from a target system, partially transferred data associated with an ongoing data transfer from the source to the target system and identify a second set of patterns associated with the partially transferred data. The computing platform may evaluate integrity of the partially transferred data by comparing the first set of patterns with the second set of patterns. The computing platform may detect whether the first set of patterns falls within an expected deviation from the second set of patterns based on the comparison and halt the ongoing data transfer based on detecting that the first set of patterns falls outside the expected deviation from the second set of patterns.

16 Claims, 11 Drawing Sheets

(51) Int. Cl.
  G06F 16/28 (2019.01)
  G06N 20/00 (2019.01)
  G06F 16/21 (2019.01)

(56) References Cited

U.S. PATENT DOCUMENTS

| | | | |
|---|---|---|---|
| 7,233,933 B2 * | 6/2007 | Horvitz | G06Q 10/109 |
| | | | 706/21 |
| 7,369,962 B2 | 5/2008 | Sandstrom et al. | |
| 7,593,904 B1 * | 9/2009 | Kirshenbaum | G06Q 10/10 |
| | | | 706/20 |
| 8,489,388 B2 * | 7/2013 | Bonnet | G06F 40/216 |
| | | | 707/755 |
| 9,185,118 B1 | 11/2015 | Agrawal | |
| 9,380,072 B2 | 6/2016 | Paul et al. | |
| 9,390,261 B2 | 7/2016 | Costa et al. | |
| 9,542,264 B2 | 1/2017 | Im et al. | |
| 10,140,977 B1 * | 11/2018 | Raux | G10L 15/063 |
| 10,769,647 B1 * | 9/2020 | Milden | G06Q 30/0254 |
| 2003/0115195 A1 | 6/2003 | Fogel et al. | |
| 2004/0054711 A1 | 3/2004 | Multer | |
| 2006/0074960 A1 | 4/2006 | Goldschmidt et al. | |
| 2007/0288537 A1 | 12/2007 | Bourbonnais et al. | |
| 2009/0119476 A1 | 5/2009 | Jernigan et al. | |
| 2009/0132461 A1 | 5/2009 | Garg et al. | |
| 2010/0036885 A1 | 2/2010 | Shen et al. | |
| 2013/0325820 A1 | 12/2013 | Grube et al. | |
| 2014/0314311 A1 | 10/2014 | Garera et al. | |
| 2015/0286524 A1 | 10/2015 | Trantham | |
| 2015/0339769 A1 | 11/2015 | deOliveira et al. | |
| 2018/0246886 A1 * | 8/2018 | Dragomirescu | G06F 16/2379 |
| 2018/0341760 A1 * | 11/2018 | Frempong | H04W 12/63 |
| 2019/0005488 A1 * | 1/2019 | Dietrich | G06Q 20/354 |
| 2019/0080164 A1 * | 3/2019 | Duke | G06V 10/82 |
| 2019/0109849 A1 | 4/2019 | Frempong et al. | |
| 2019/0191009 A1 * | 6/2019 | Wright | H04L 67/34 |
| 2019/0222560 A1 | 7/2019 | Ford et al. | |
| 2019/0228004 A1 | 7/2019 | Karandikar et al. | |
| 2019/0259034 A1 * | 8/2019 | Frank | G06Q 20/42 |
| 2020/0410588 A1 * | 12/2020 | Bax | G06Q 40/08 |
| 2021/0075793 A1 * | 3/2021 | Dunjic | H04L 63/0884 |
| 2021/0165803 A1 * | 6/2021 | Deshpande | G06F 16/26 |
| 2021/0349865 A1 * | 11/2021 | Shah | G06Q 30/0283 |

OTHER PUBLICATIONS

Apr. 28, 2023—U.S. Final Office Action—U.S. Appl. No. 17/334,659.
Aug. 22, 2023—U.S. Non-Final Office Action—U.S. Appl. No. 17/334,659.
Dec. 13, 2023—(US) Notice of Allowance—U.S. Appl. No. 17/334,659.
Mar. 29, 2024—(US) Notice of Allowance—U.S. Appl. No. 17/334,659.

* cited by examiner

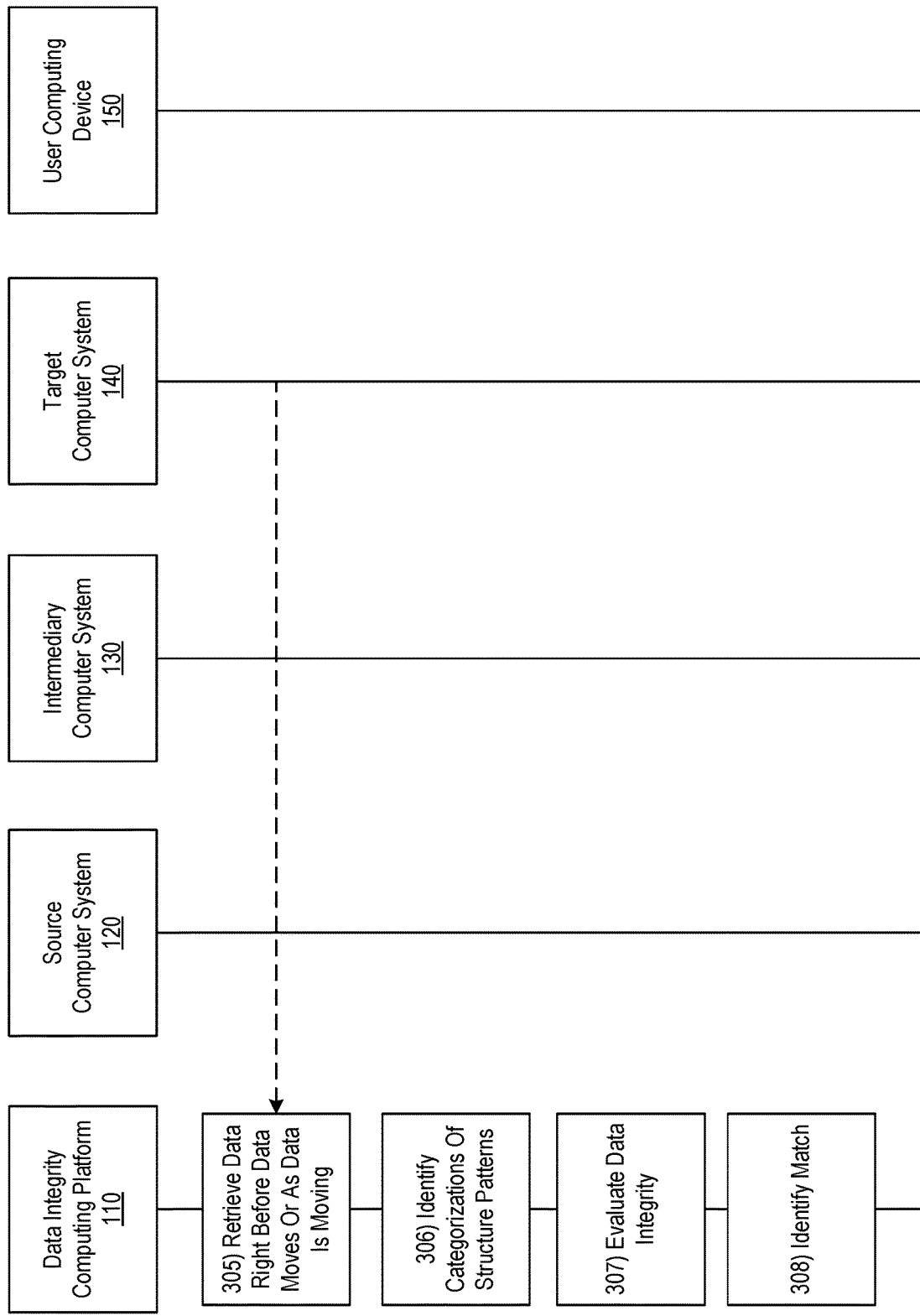

DATA FEED META DETAIL CATEGORIZATION FOR CONFIDENCE

BACKGROUND

Aspects of the disclosure relate to computer hardware and software. In particular, one or more aspects of the disclosure generally relate to computer hardware and software for data feed meta detail categorization for confidence. More specifically, one or more aspects relate to computer hardware and software for validating data integrity, including accuracy, completeness, and consistency of data, with high confidence during data transmission between computing systems.

Data is often shared between systems. For example, data from one application may be referenced or made available to other applications. A data feed may be established between a first application and a second application so that the second application may reference the data from the first application. Such data feeds may transmit data from one application to another near real-time or on a schedule. In some instances, data may be lost, converted, or improperly handled, causing the data to be inaccurate on the subscribing system (e.g., the second application). Current techniques for capturing a confidence around the quality and accuracy of data as it is shared include hashing the data or check counts of records. Such techniques, however, are computationally expensive and resource intensive, especially with a large amount of data.

SUMMARY

Aspects of the disclosure provide effective, efficient, scalable, and convenient technical solutions that address and overcome the technical problems associated with confidence of data movement between systems. In particular, one or more aspects of the disclosure provide a computationally efficient solution for building confidence around the quality and accuracy of data that is shared between systems (e.g., confidence that the data that exists in one system matches the data in another). Additional aspects of the disclosure may provide the ability to identify the categorization of structure patterns of data being sent to ensure that the type and patterns in the data align with tolerances (e.g., an expected deviation or threshold drift) based on machine learning.

In accordance with one or more embodiments, a computing platform having at least one processor, a communication interface, and memory may retrieve source data from a source system. The computing platform may identify a first set of patterns associated with the source data. In some examples, the computing platform may retrieve, from a target system, partially transferred data associated with an ongoing data transfer from the source system to the target system. The computing platform may identify a second set of patterns associated with the partially transferred data. The computing platform may evaluate integrity of the partially transferred data by comparing the first set of patterns associated with the source data, with the second set of patterns associated with the partially transferred data, to detect whether the first set of patterns falls within an expected deviation from the second set of patterns based on the comparing of the first set of patterns associated with the source data, with the second set of patterns associated with the partially transferred data. The computing platform may halt the ongoing data transfer from the source system to the target system based on detecting that the first set of patterns falls outside the expected deviation from the second set of patterns.

In some embodiments, the computing platform may continue the ongoing data transfer from the source system to the target system based on detecting that the first set of patterns falls within the expected deviation from the second set of patterns.

In some arrangements, the computing platform may send one or more notifications based on detecting that the first set of patterns falls outside the expected deviation from the second set of patterns. In addition, sending the one or more notifications may include sending one or more alert messages to a user computing device.

In some examples, identifying the first set of patterns in the source data may include identifying categorizations of structure patterns in the source data.

In some embodiments, identifying the first set of patterns in the source data may include identifying one or more types of data in each field.

In some example arrangements, identifying the first set of patterns in the source data may include extracting a histogram identifying frequency of occurrence of different types of data in each field.

In some embodiments, evaluating the integrity of the partially transferred data may include identifying a volume of data partially transferred to the target system.

In some examples, identifying the first set of patterns associated with the source data may include identifying patterns in unstructured data.

In some embodiments, retrieving the source data from the source system may include retrieving source data from an enterprise computing system. In some embodiments, retrieving the source data from the source system may include retrieving source data from a third party computing system.

In some arrangements, the computing platform may train a machine learning model based on historical data, and evaluate integrity of the partially transferred data based on the trained machine learning model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3C depict another illustrative event sequence for data feed meta detail categorization for confidence in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
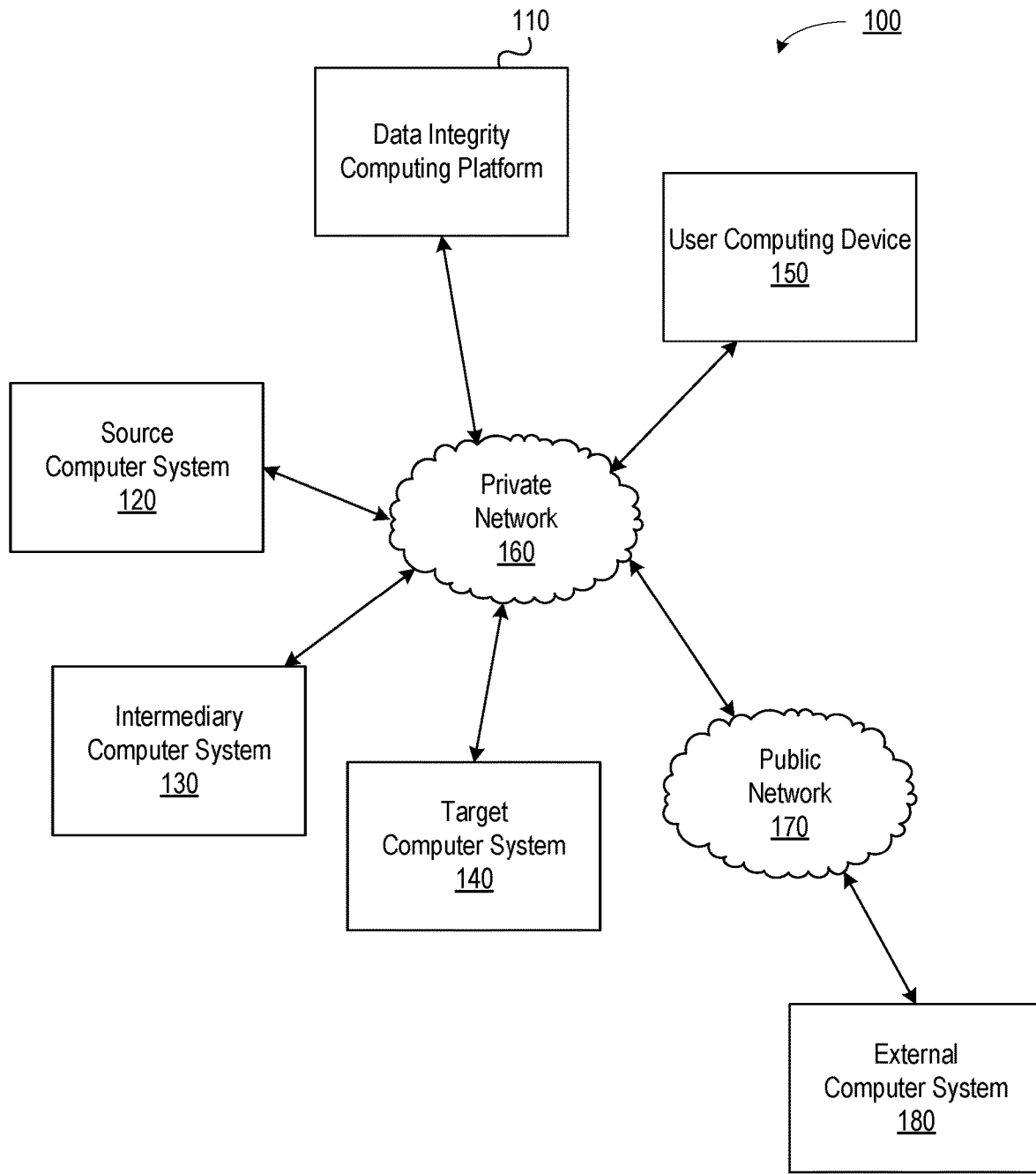
FIGS. 1A and 1B depict an illustrative computing environment for data feed meta detail categorization for confidence in accordance with one or more example embodiments.
Figure 1B:
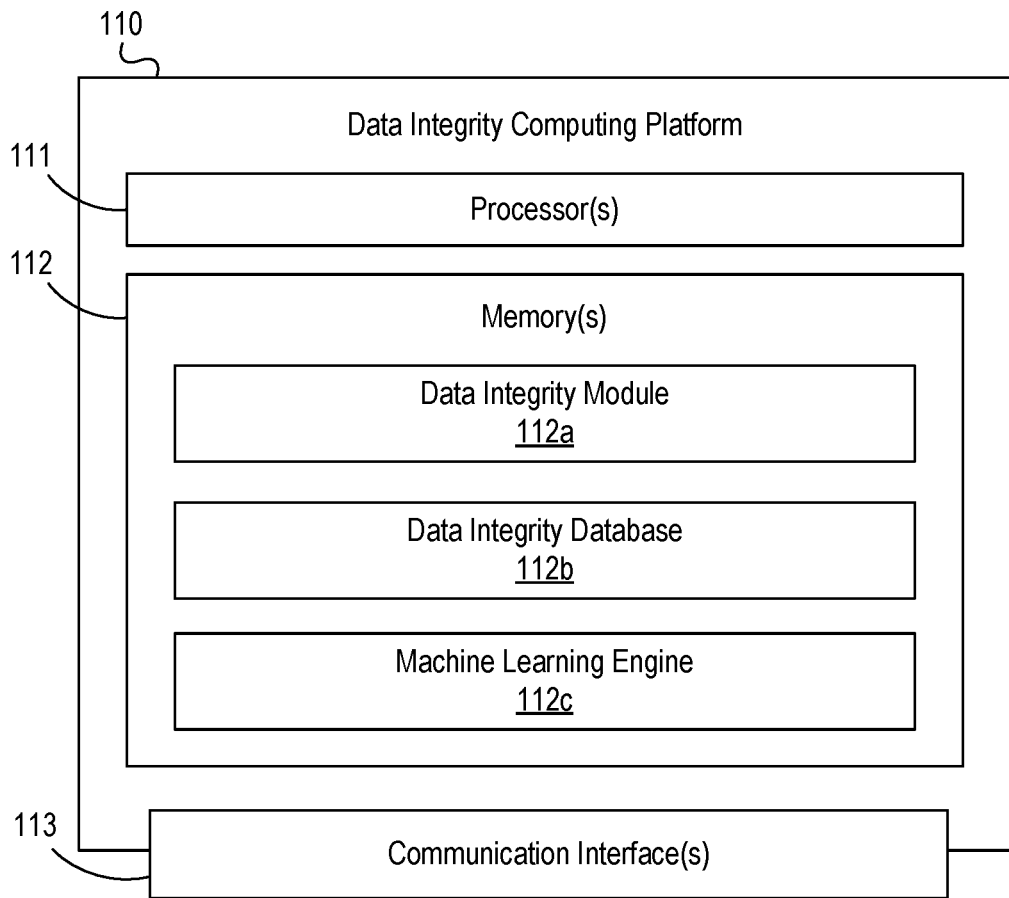

FIGS. 1A and 1B depict an illustrative computing environment for data feed meta detail categorization for confidence in accordance with one or more example embodiments. Referring to FIG. 1A, computing environment 100 may include one or more computing devices and/or other computing systems. For example, computing environment 100 may include data integrity computing platform 110, source computer system 120, intermediary computer system 130, target computer system 140, user computing device 150, and external computer system 180. Although a source computer system 120, an intermediary computer system 130, and a target computer system 140 are shown for illustrative purposes, any number of computing devices and/or computing systems may be used without departing from the disclosure. In addition, although one user computing device 150 is shown for illustrative purposes, any number of user computing devices and/or computing systems may be used without departing from the disclosure.

As illustrated in greater detail below, data integrity computing platform 110 may include one or more computing devices configured to perform one or more of the functions described herein. For example, data integrity computing platform 110 may include one or more computers (e.g., laptop computers, desktop computers, servers, server blades, or the like).

Source computer system 120 may, for example, create, store, manipulate, manage, provide access to, and/or otherwise maintain enterprise information, such as one or more enterprise data sets. In some instances, source computer system 120 also may run and/or otherwise execute a machine learning algorithm (which may, e.g., be configured to run one or more checks on data transferred to and/or from source computer system 120). Intermediary computer system 130 may, for example, create, store, manipulate, manage, provide access to, and/or otherwise maintain enterprise information, such as one or more enterprise data sets. In some instances, intermediary computer system 130 also may run and/or otherwise execute a machine learning algorithm (which may, e.g., be configured to run one or more checks on data transferred to and/or from intermediary computer system 130). Target computer system 140 also may, for example, create, store, manipulate, manage, provide access to, and/or otherwise maintain enterprise information, such as one or more enterprise data sets. In addition, target computer system 140 may, in some instances, run and/or otherwise execute a machine learning algorithm (which may, e.g., be configured to run one or more checks on data transferred to and/or from target computer system 140).

External computer system 180 may, for example, be owned by, operated by, maintained by, used by, and/or otherwise associated with one or more entities different from the organization that may own, operate, maintain, and/or use source computer system 120, intermediary computer system 130, target computer system 140, and user computing device 150. In some instances, external computer system 180 may send enterprise information to one or more of source computer system 120, intermediary computer system 130, target computer system 140, and user computing device 150, and/or receive enterprise information from one or more of source computer system 120, intermediary computer system 130, target computer system 140, and user computing device 150, as illustrated in greater detail below.

User computing device 150 may include one or more computing devices and/or other computer components (e.g., processors, memories, communication interfaces). For instance, user computing device 150 may be a server, desktop computer, laptop computer, tablet, mobile device, or the like, and may be associated with an enterprise organization operating data integrity computing platform 110.

Computing environment 100 also may include one or more networks, which may interconnect one or more of data integrity computing platform 110, source computer system 120, intermediary computer system 130, target computer system 140, user computing device 150, and external computer system 180. For example, computing environment 100 may include private network (e.g., an organization network) 160 and public network 170. Private network 160 and/or public network 170 may include one or more sub-networks (e.g., LANs, WANs, or the like). Private network 160 may be associated with a particular organization (e.g., a corporation, financial institution, educational institution, governmental institution, or the like) and may interconnect one or more computing devices associated with the organization. For example, data integrity computing platform 110, source computer system 120, intermediary computer system 130, target computer system 140, and user computing device 150 may be associated with an organization (e.g., a financial institution), and private network 160 may be associated with and/or operated by the organization, and may include one or more networks (e.g., LANs, WANs, VPNs, or the like) that interconnect data integrity computing platform 110, source computer system 120, intermediary computer system 130, target computer system 140, user computing device 150, and one or more other computing devices and/or computer systems that are used by, operated by, and/or otherwise associated with the organization. Public network 170 may connect private network 160 and/or one or more computing devices connected thereto (e.g., data integrity computing platform 110, source computer system 120, intermediary computer system 130, target computer system 140, and user computing device 150) with one or more networks and/or computing devices that are not associated with the organization. For example, external computer system 180 might not be associated with an organization that operates private network 160 (e.g., because external computer system 180 may be owned and/or operated by one or more entities different from the organization that operates private network 160, rather than being owned and/or operated by the organization itself or an employee or affiliate of the organization), and public network 170 may include one or more networks (e.g., the internet) that connect external computer system 180 to private network 160 and/or one or more computing devices connected thereto (e.g., data integrity computing platform 110, source computer system 120, intermediary computer system 130, target computer system 140, and user computing device 150).

In one or more arrangements, data integrity computing platform 110, source computer system 120, intermediary computer system 130, target computer system 140, user computing device 150, and external computer system 180 may be any type of computing device capable of receiving a user interface, receiving input via the user interface, and communicating the received input to one or more other computing devices. For example, data integrity computing platform 110, source computer system 120, intermediary computer system 130, target computer system 140, user computing device 150, external computer system 180, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, data integrity computing platform 110 may include one or more processor(s) 111, memory(s) 112, and communication interface(s) 113. A data bus may interconnect processor 111, memory 112, and communication interface 113. Communication interface 113 may be a network interface configured to support communication between data integrity computing platform 110 and one or more networks (e.g., private network 160, public network 170, or the like). Memory 112 may include one or more program modules having instructions that when executed by processor 111 cause data integrity computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of data integrity computing platform 110 and/or by different computing devices that may form and/or otherwise make up data integrity computing platform 110. For example, memory 112 may have, store, and/or include a data integrity module 112a, a data integrity database 112b, and a machine learning engine 112c. Data integrity module 112a may have instructions that direct and/or cause data integrity computing platform 110 to identify the categorization of structure patterns of data being sent, to check that the type and likelihood of patterns in the data match the structures and patterns expected based on machine learning and/or perform other functions, as discussed in greater detail below. Data integrity database 112b may store information used by data integrity module 112a and/or data integrity computing platform 110 in validating data integrity, including accuracy, completeness, and consistency of data, with high confidence during data transmission between computing systems and/or in performing other functions. Machine learning engine 112c may have instructions that direct and/or cause data integrity computing platform 110 to set, define, and/or iteratively redefine rules, techniques and/or other parameters used by data integrity computing platform 110 and/or other systems in computing environment 100 in performing data feed meta detail categorization for confidence.

Figure 2A:
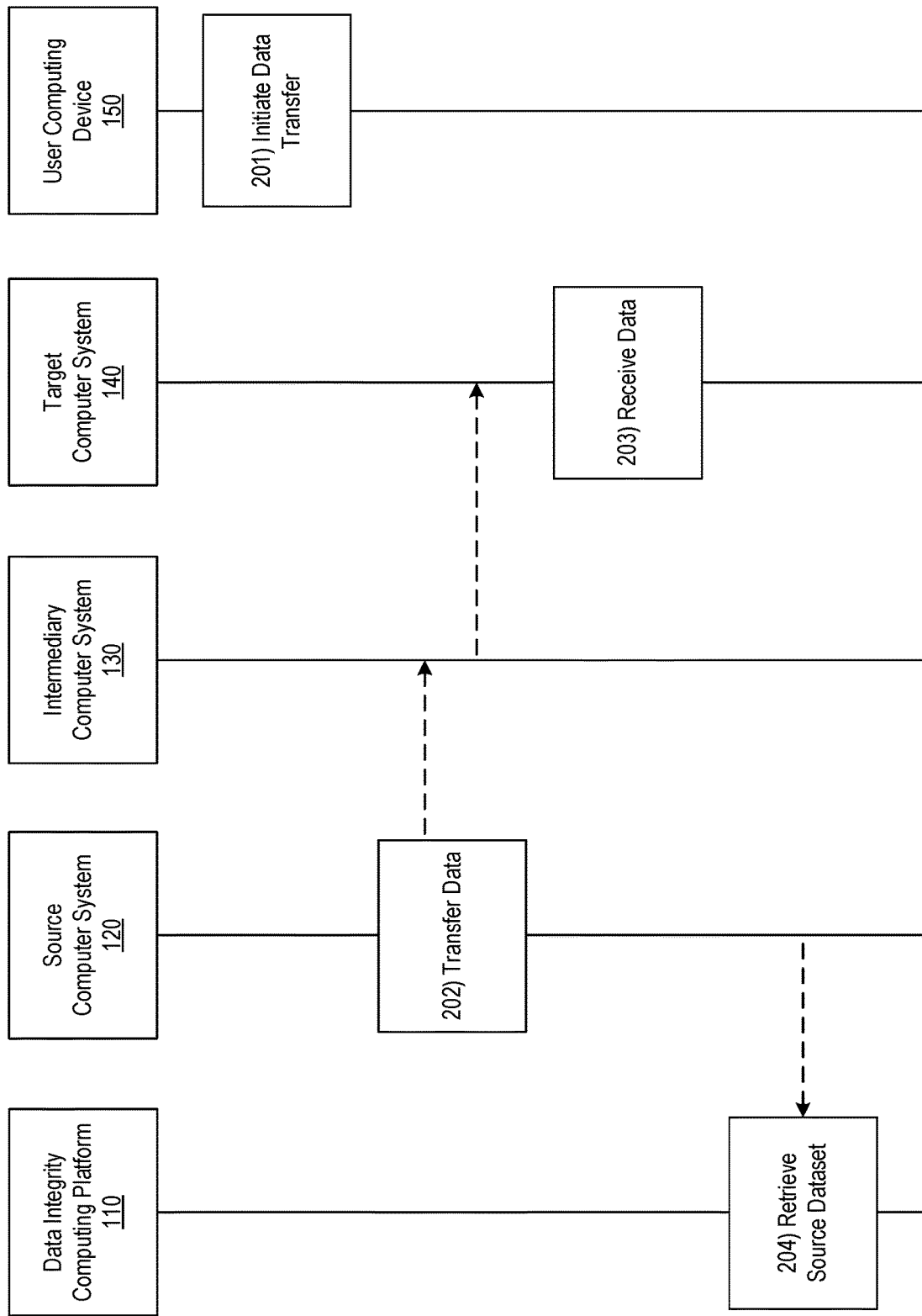
FIGS. 2A-2C depict an illustrative event sequence for data feed meta detail categorization for confidence in accordance with one or more example embodiments.
Figure 2B:
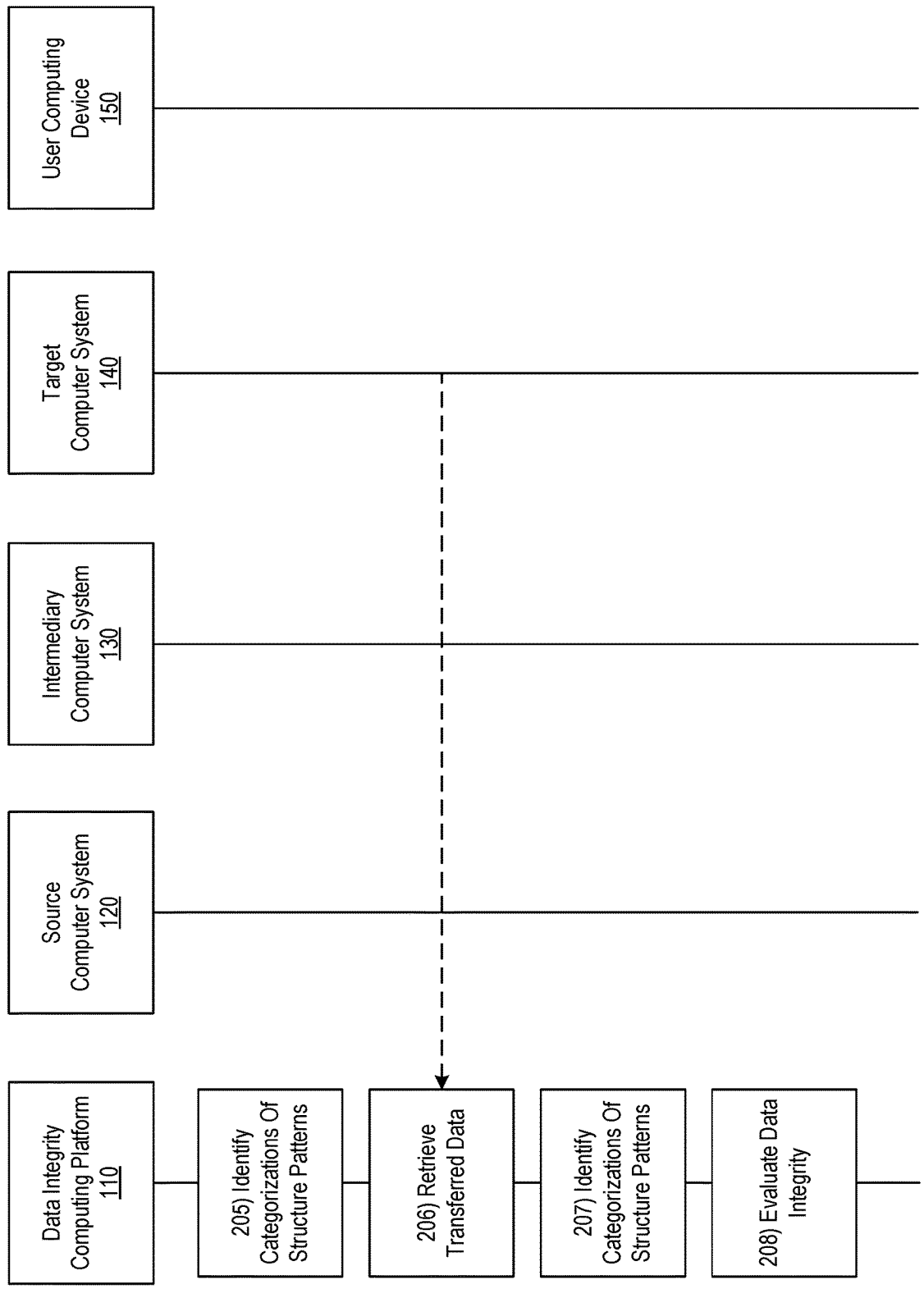
Figure 2C:
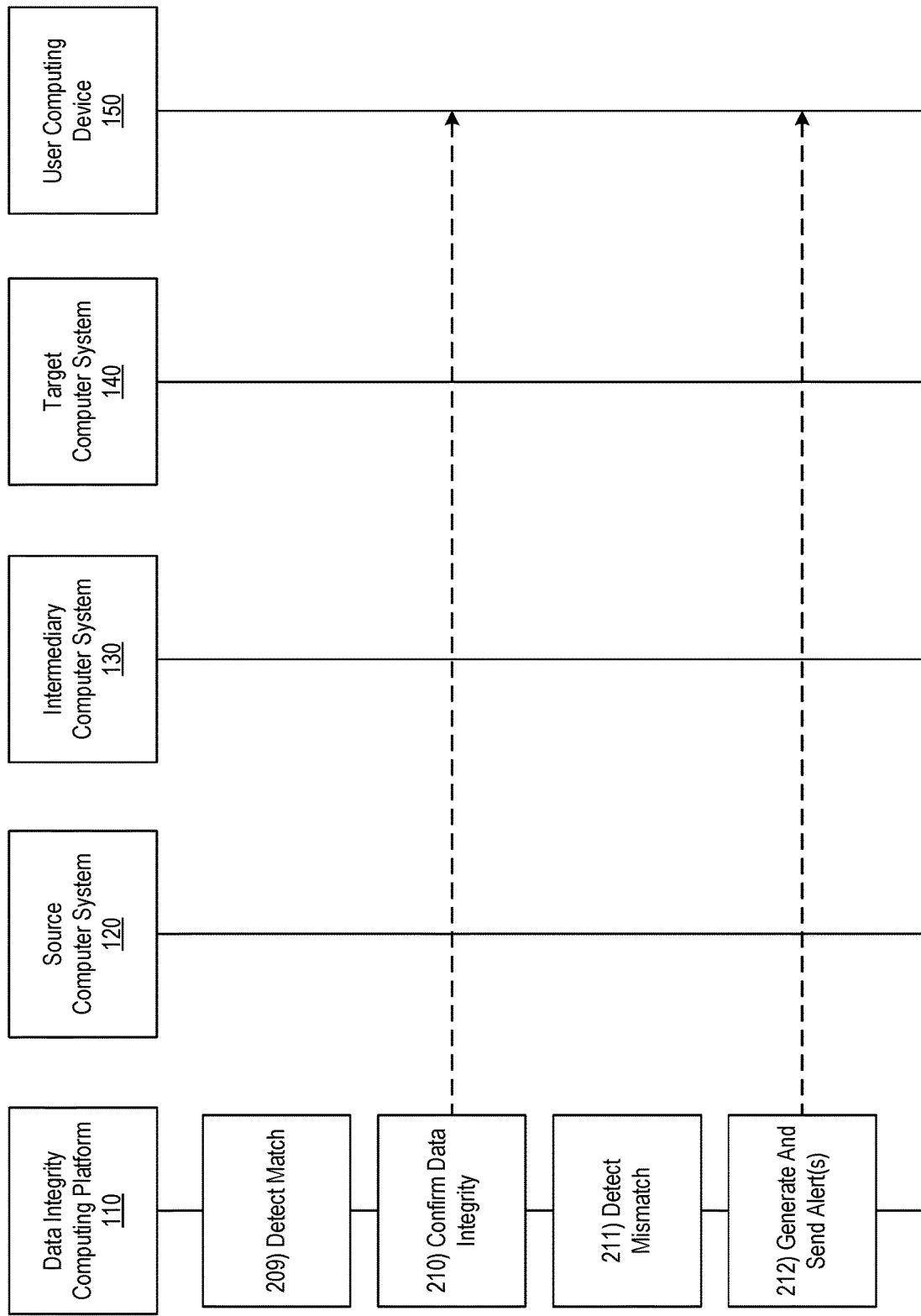

FIGS. 2A-2C depict an illustrative event sequence for data feed meta detail categorization for confidence in accordance with one or more example embodiments. For example, the example event sequence depicted in FIGS. 2A-2C illustrates a post-processing use case for data feed meta detail categorization for confidence. Additionally, techniques may be implemented to evaluate data after it has arrived at an end system, perform data validation, and determine whether the data is corrupted.

Referring to FIG. 2A, at step 201, a user of a computing device (e.g., user computing device 150), may initiate sharing or transferring of data between two or more computing devices and/or computing systems. At step 202, based on the initiated transfer, data may be shared between a source system (e.g., source computer system 120) and a target or destination system (e.g., target computer system 140). In some examples, source data may pass through one or more systems before reaching a target system. For instance, data may move from a source system (e.g., source computer system 120) to one or more intermediary systems (e.g., intermediary computer system 130) before reaching a target system (e.g., target computer system 140) at step 203.

At step 204, data integrity computing platform 110 may retrieve, via the communication interface (e.g., communication interface 113), source data from a source system. In some examples, data integrity computing platform 110 may retrieve source data from an enterprise computing system (e.g., source computer system 120). In some examples, data integrity computing platform 110 may retrieve source data from a third party computing system (e.g., external computer system 180).

Referring to FIG. 2B, at step 205, data integrity computing platform 110 may identify (e.g., catalog) a first set of patterns associated with the source data. In some examples, the source data may be and/or include structured and/or unstructured data. For example, data integrity computing platform 110 may identify categorizations of structure patterns in the source data. In cataloging patterns, data integrity computing platform 110 may evaluate fields or rows against a list of regular patterns or expressions (e.g., common patterns) and find the one that best matches the type of data in a given field. In addition, data integrity computing platform 110 may catalog the counts for the overall data set. For example, patterns in an email field may include external email, internal email, or length of email over a certain number of characters. For example, patterns in a phone number field may include seven digit phone numbers, ten digit phone numbers, ten digit phone number with parentheses, or certain country prefixes. In another example, patterns in an address field may include a standard street address in a certain country, a post office box address, or a military address. In another example, patterns in a syslog or other message log may include data that starts with a datetime, data that includes a stack trace, data that contains IP or hostnames. In a further example, patterns in customer data may include hyphenated first names, count of words in a name, or length of a name.

In some examples, data integrity computing platform 110 may identify one or more types of data in each field. In a non-limiting example, data integrity computing platform 110 may determine that, in a first field: 70% match an external email pattern, 10% match an internal email pattern, and 20% match another pattern. In addition, data integrity computing platform 110 may determine that, in a second field: 80% match a ten digit phone number without parentheses pattern, 10% match a UK phone number pattern, and 10% match another pattern. In addition, data integrity computing platform 110 may determine that, in a third field: 60% match a US standard street address pattern, 10% match a PO box address pattern, 10% match an international address pattern, and 20% match another pattern.

In another non-limiting example, columns in a table may include: first name, last name, user ID, date hired, and home address fields. In the "first name" field, integrity computing platform 110 may determine that: 75% of the time the data matches a pattern of 4 or less characters (e.g., "John," "Jane") and 25% of the time the data matches a pattern of characters, hyphen, characters, space, then characters (e.g., "Anne-Marie III"). In the "last name" field, integrity computing platform 110 may determine that: 50% of the time the data includes 6 or less characters (e.g., "Smith"), and 25% of the time the data includes more than 5 characters (e.g., "Williams"). In the "date hired" field, integrity computing platform 110 may determine that: 100% of the time the data matches a Month/Day/Year pattern (e.g., "01/02/2000"). In the "home address" field, integrity computing platform 110 may determine that: 75% of the time the data matches a pattern of numbers followed by words (e.g., "123 Main Street"), and 25% of the time the data matches a pattern of numbers, words, numbers, words, numbers (e.g., a mail address format for France). In addition, data integrity computing platform 110 may extract a histogram identifying frequency or percentage of occurrence of different types of data in each field.

At step 206, data integrity computing platform 110 may retrieve, via the communication interface (e.g., communication interface 113), from a target system, transferred data associated with a data transfer from the source system to the target system. At step 207, data integrity computing platform 110 may identify a second set of patterns associated with transferred data.

At step 208, data integrity computing platform 110 may evaluate integrity of the transferred data (e.g., the data received or stored in the target system) by comparing the identified first set of patterns associated with the source data, with the identified second set of patterns associated with the transferred data. In some examples, in evaluating the integrity of the transferred data, data integrity computing platform 110 may identify a volume of data (e.g., in megabytes, or another unit of storage) transferred to the target system. In addition, in evaluating integrity of the transferred data, data integrity computing platform 110 may train a machine learning model based on historical data, and evaluate integrity of the transferred data based on the trained machine learning model. For instance, data integrity computing platform 110 may forecast data patterns in time series data using an exponential smoothing model. Such exponential smoothing model may capture trends in the volume of data, adjust for seasonality, and filter out noise data. The forecasted data patterns may be used to evaluate integrity of the transferred data. In some examples, the shape of the histogram identifying frequency or percentage of occurrence of different types of data in each field may be expected to hold relatively constant for subsequent transfers of data.

Based on the comparing of the first set of patterns associated with the source data (e.g., identified at step 205), with the second set of patterns associated with the transferred data (e.g., identified at step 207), data integrity computing platform 110 may detect whether the first set of patterns falls within an expected deviation or threshold drift from the second set of patterns.

Referring to FIG. 2C, in some examples, at step 209, data integrity computing platform 110 may detect that the first set of patterns falls within the expected deviation from the second set of patterns. For example, data integrity computing platform 110 may detect that the first set of patterns includes patterns matching phone numbers, and the second set of patterns includes patterns that are close enough (e.g., within an expected threshold) to the first set of phone number patterns (e.g., using threshold drift or expected deviation as a metric of identifying commonality). As a result, at step 210, data integrity computing platform 110 may generate and send, via the communication interface (e.g., communication interface 113), one or more notifications confirming data integrity (e.g., that data is accurate and complete).

Figure 4:
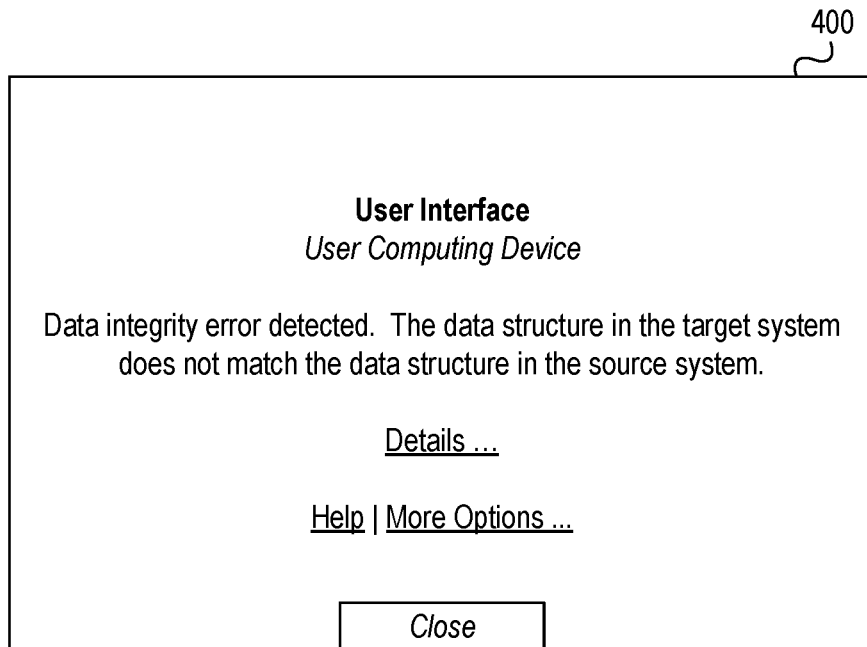
FIGS. 4 and 5 illustrative graphical user interfaces associated with data feed meta detail categorization for confidence in accordance with one or more example embodiments.

In some examples, at step 211, data integrity computing platform 110 may detect that the first set of patterns falls outside the expected deviation from the second set of patterns. For example, data integrity computing platform 110 may detect that the first set of patterns includes patterns matching phone numbers, but the second set of patterns includes patterns matching email addresses. As a result, at step 212, data integrity computing platform 110 may generate and send, via the communication interface (e.g., communication interface 113), one or more alerts or notifications regarding a problematic data transfer and trigger investigations. For example, data integrity computing platform 110 may generate and send one or more alert messages to a user computing device (e.g., user computing device 150). For example, data integrity computing platform 110 may cause the user computing device (e.g., user computing device 150) to display and/or otherwise present one or more graphical user interfaces similar to graphical user interface 400, which is illustrated in FIG. 4. As seen in FIG. 4, graphical user interface 400 may include text and/or other information notifying the user of the computing device (e.g., user computing device 150) of a data integrity error and/or generating reports (e.g., "Data integrity error detected. The data structure in the target system does not match the data structure in the source system. [Details . . . ]"). It will be appreciated that other and/or different notifications may also be provided.

Figure 3A:
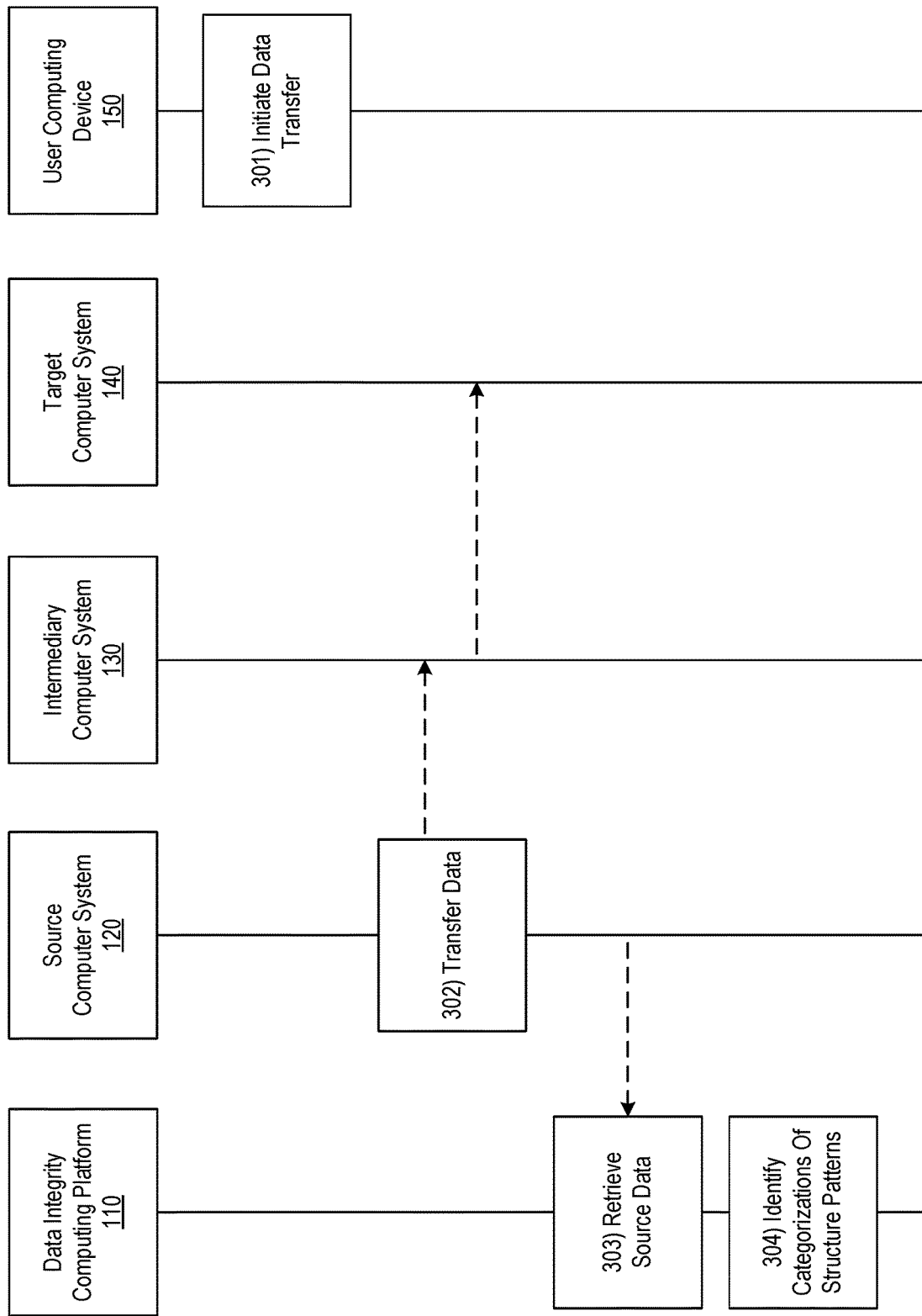
Figure 3C:
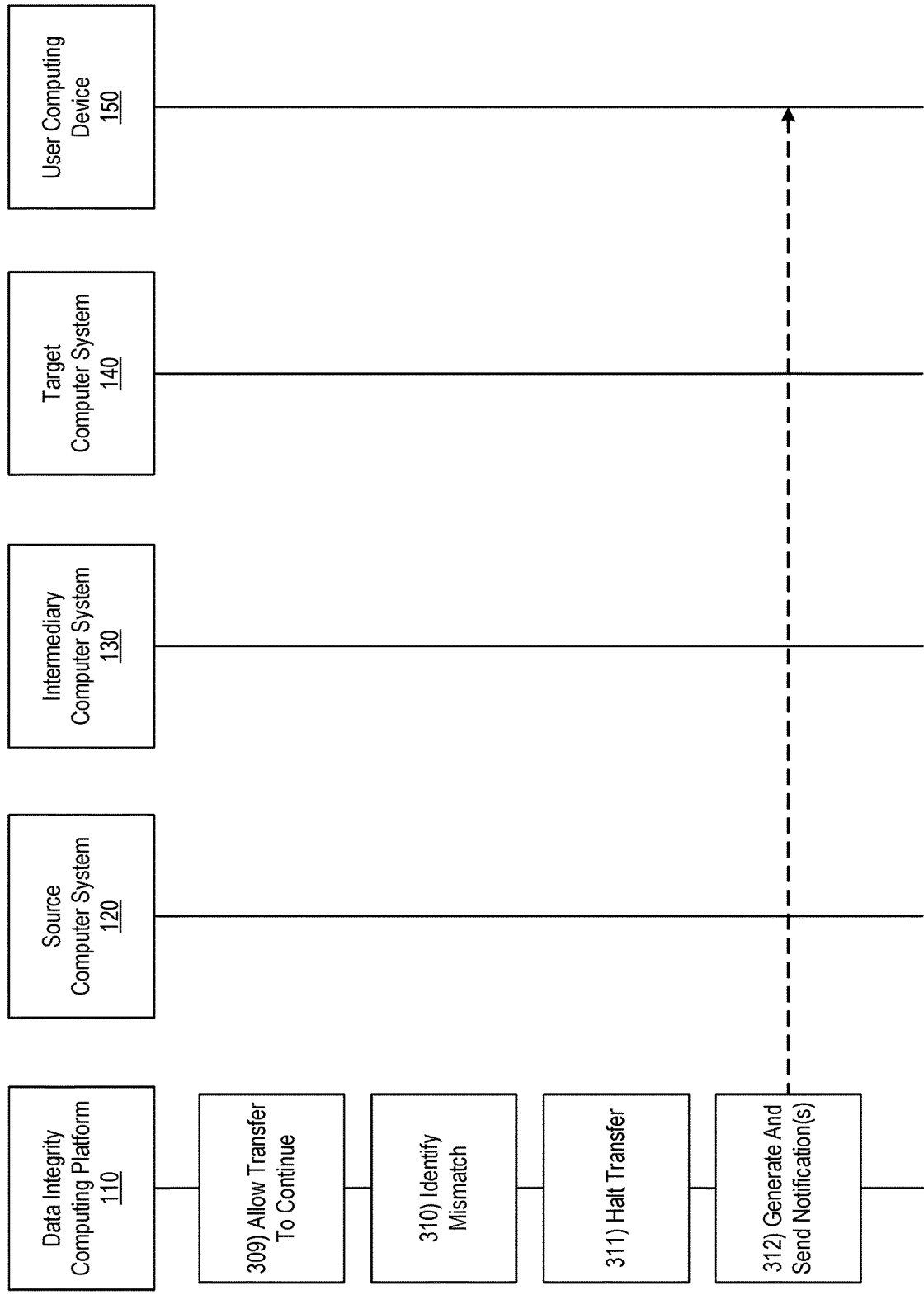

FIGS. 3A-3C depict another illustrative event sequence for data feed meta detail categorization for confidence in accordance with one or more example embodiments. For example, the example event sequence depicted in FIGS. 3A-3C illustrates a pre-processing or real-time use case for data feed meta detail categorization. Additionally, techniques may be implemented to perform data validation right before or as data is being moved, determine whether the data is corrupted, halting transfer of corrupted data, and sending notifications. In this way, data integrity computing platform 110 may prevent tainted or corrupted data from being written or transferred.

Referring to FIG. 3A, at step 301, a user of a computing device (e.g., user computing device 150), may initiate sharing or transferring of data between two or more computing devices and/or computing systems. At step 302, based on the initiated transfer, data may be shared between a source system (e.g., source computer system 120) and a target or destination system (e.g., target computer system 140). In some examples, source data may pass through one or more systems before reaching a target system. For instance, data may move from a source system (e.g., source computer system 120) to one or more intermediary systems (e.g., intermediary computer system 130) before reaching a target system (e.g., target computer system 140).

At step 303, data integrity computing platform 110 may retrieve, via the communication interface (e.g., communication interface 113), source data from a source system. In some examples, data integrity computing platform 110 may retrieve source data from an enterprise computing system (e.g., source computer system 120). In some examples, data integrity computing platform 110 may retrieve source data from a third party computing system (e.g., external computer system 180).

At step 304, data integrity computing platform 110 may identify (e.g., catalog) a first set of patterns associated with the source data. In some examples, the source data may be and/or include structured and/or unstructured data. For example, data integrity computing platform 110 may identify categorizations of structure patterns in the source data. In cataloging patterns, data integrity computing platform

110 may evaluate fields or rows against a list of regular patterns or expressions (e.g., common patterns) and find the one that best (e.g., most closely) matches the type of data in a given field. In addition, data integrity computing platform 110 may catalog the counts for the overall data set. For example, patterns in an email field may include external email, internal email, or length of email over a certain number of characters. For example, patterns in a phone number field may include seven digit phone numbers, ten digit phone numbers, ten digit phone number with parentheses, or certain country prefixes. In another example, patterns in an address field may include a standard street address in a certain country, a post office box address, or a military address. In another example, patterns in a syslog or other message log may include data that starts with a datetime, data that includes a stack trace, data that contains IP or hostnames. In a further example, patterns in customer data may include hyphenated first names, count of words in a name, or length of a name.

In some examples, data integrity computing platform 110 may identify one or more types of data in each field. In a non-limiting example, data integrity computing platform 110 may determine that, in a first field: 70% match an external email pattern, 10% match an internal email pattern, and 20% match another pattern. In addition, data integrity computing platform 110 may determine that, in a second field: 80% match a ten digit phone number without parentheses pattern, 10% match a UK phone number pattern, and 10% match another pattern. In addition, data integrity computing platform 110 may determine that, in a third field: 60% match a US standard street address pattern, 10% match a PO box address pattern, 10% match an international address pattern, and 20% match another pattern.

In another non-limiting example, columns in a table may include: first name, last name, user ID, date hired, and home address fields. In the "first name" field, integrity computing platform 110 may determine that: 75% of the time the data matches a pattern of 4 or less characters (e.g., "John," "Jane") and 25% of the time the data matches a pattern of characters, hyphen, characters, space, then characters (e.g., "Anne-Marie III"). In the "last name" field, integrity computing platform 110 may determine that: 50% of the time the data includes 6 or less characters (e.g., "Smith"), and 25% of the time the data includes more than 5 characters (e.g., "Williams"). In the "date hired" field, integrity computing platform 110 may determine that: 100% of the time the data matches a Month/Day/Year pattern (e.g., "01/02/2000"). In the "home address" field, integrity computing platform 110 may determine that: 75% of the time the data matches a pattern of numbers followed by words (e.g., "123 Main Street"), and 25% of the time the data matches a pattern of numbers, words, numbers, words, numbers (e.g., a mail address format for France). In addition, data integrity computing platform 110 may extract a histogram identifying frequency or percentage of occurrence of different types of data in each field.

Referring to FIG. 3B, at step 305, data integrity computing platform 110 may retrieve, via the communication interface (e.g., communication interface 113), from a target system, partially transferred data (e.g., data that has already arrived (e.g., received or stored) at the target system) associated with an ongoing data transfer from the source system to the target system. At step 306, data integrity computing platform 110 may identify a second set of patterns associated with the partially transferred data.

At step 307, data integrity computing platform 110 may evaluate integrity of the partially transferred data by comparing the first set of patterns associated with the source data, with the second set of patterns associated with the partially transferred data. For instance, data integrity computing platform 110 may validate data in real time or pre-process data right before or as data is moving, to determine whether an error has occurred.

In some examples, in evaluating the integrity of the partially transferred data, data integrity computing platform 110 may identify a volume of data (e.g., in megabytes, or another unit of storage) partially transferred to the target system. In addition, in evaluating integrity of the partially transferred data, data integrity computing platform 110 may train a machine learning model based on historical data, and evaluate integrity of the partially transferred data based on the trained machine learning model. For instance, data integrity computing platform 110 may forecast data patterns in time series data using an exponential smoothing model. Such exponential smoothing model may capture trends in the volume of data, adjust for seasonality, and filter out noise data. The forecasted data patterns may be used to evaluate integrity of the partially transferred data. In some examples, the shape of the histogram identifying frequency or percentage of occurrence of different types of data in each field may be expected to hold relatively constant for subsequent transfers of data.

Based on the comparing of the first set of patterns associated with the source data (e.g., identified at step 304), with the second set of patterns associated with the partially transferred data (e.g., identified at step 306), data integrity computing platform 110 may detect whether the first set of patterns falls within an expected deviation or threshold drift from the second set of patterns.

In some examples, at step 308, data integrity computing platform 110 may detect that the first set of patterns falls within the expected deviation from the second set of patterns. For example, data integrity computing platform 110 may detect that the first set of patterns includes patterns matching phone numbers, and the second set of patterns includes patterns that are close enough to the first set of phone number patterns (e.g., using threshold drift or expected deviation as a metric of identifying commonality). Referring to FIG. 3C, as a result, at step 309, data integrity computing platform 110 may continue the ongoing data transfer from the source system to the target system.

Figure 5:
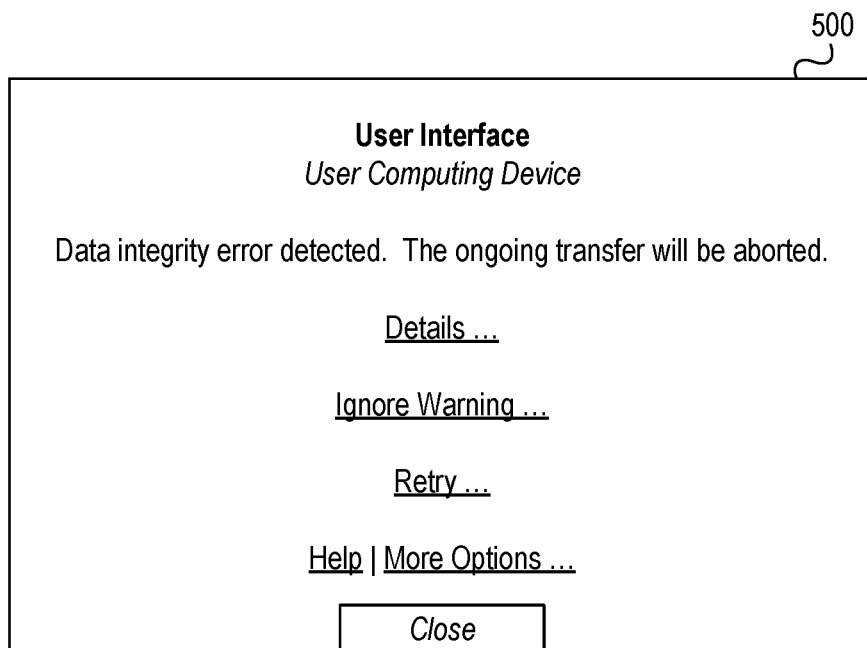

In some examples, at step 310, data integrity computing platform 110 may detect that the first set of patterns falls outside the expected deviation from the second set of patterns. For example, data integrity computing platform 110 may detect that the first set of patterns includes patterns matching phone numbers, but the second set of patterns includes patterns matching email addresses. As a result, at step 311, data integrity computing platform 110 may halt the ongoing data transfer from the source system to the target system. Additionally or alternatively, data integrity computing platform 110 may, at step 312, generate and send, via the communication interface (e.g., communication interface 113), one or more alerts or notifications regarding a problematic data transfer and trigger investigations. For example, data integrity computing platform 110 may generate and send one or more alert messages to a user computing device (e.g., user computing device 150). For example, data integrity computing platform 110 may cause the user computing device (e.g., user computing device 150) to display and/or otherwise present one or more graphical user interfaces similar to graphical user interface 500, which is illustrated in FIG. 5. As seen in FIG. 5, graphical user interface 500 may include text and/or other information notifying the user of the computing device (e.g., user computing device 150) of that an ongoing data transfer will be halted or otherwise prevented from completing (e.g., "Data integrity error detected. The ongoing transfer will be aborted. [Details . . . ] [Ignore Warning . . . ] [Retry]"). It will be appreciated that other and/or different notifications may also be provided.

Figure 6:
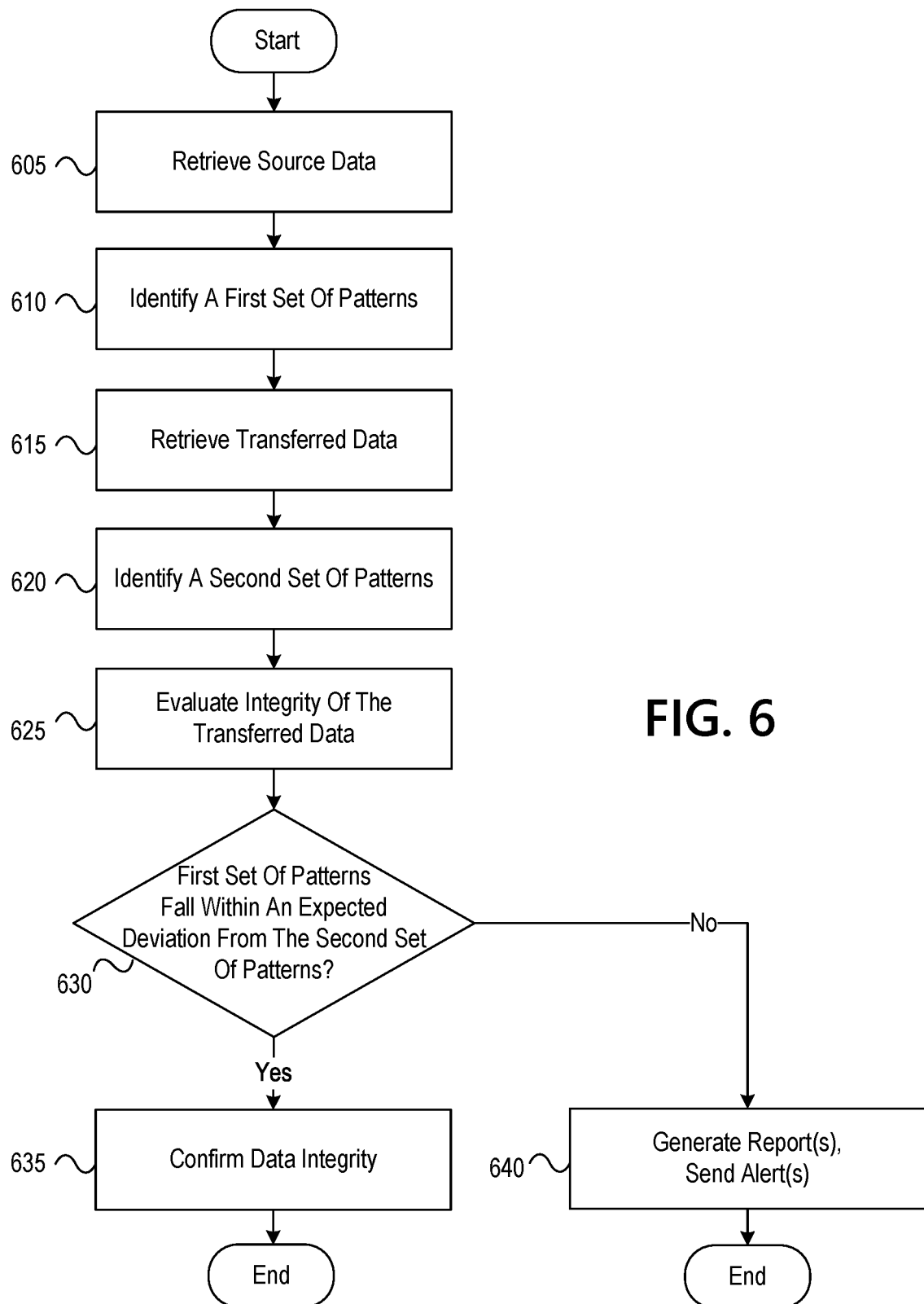
FIGS. 6 and 7 depict illustrative methods for data feed meta detail categorization for confidence in accordance with one or more example embodiments.

FIG. 6 depicts an illustrative method for data feed meta detail categorization for confidence in accordance with one or more example embodiments. Referring to FIG. 6, at step 605, a computing platform having at least one processor, a communication interface, and memory may retrieve, source data from a source system. At step 610, the computing platform may identify a first set of patterns associated with the source data. At step 615, the computing platform may retrieve, from a target system, transferred data associated with a data transfer from the source system to the target system. At step 620, the computing platform may identify a second set of patterns associated with transferred data. At step 625, the computing platform may evaluate integrity of the transferred data by comparing the first set of patterns associated with the source data, with the second set of patterns associated with the transferred data. At step 630, the computing platform may detect whether the first set of patterns falls within an expected deviation from the second set of patterns based on the comparing of the first set of patterns associated with the source data, with the second set of patterns associated with the transferred data. At step 635, based on detecting that the first set of patterns falls within the expected deviation from the second set of patterns, the computing platform may confirm data integrity and send one or more notifications confirming data integrity. At step 640, based on detecting that the first set of patterns falls outside the expected deviation from the second set of patterns the computing platform may generate one or more reports and/or send one or more notifications or alerts.

Figure 7:
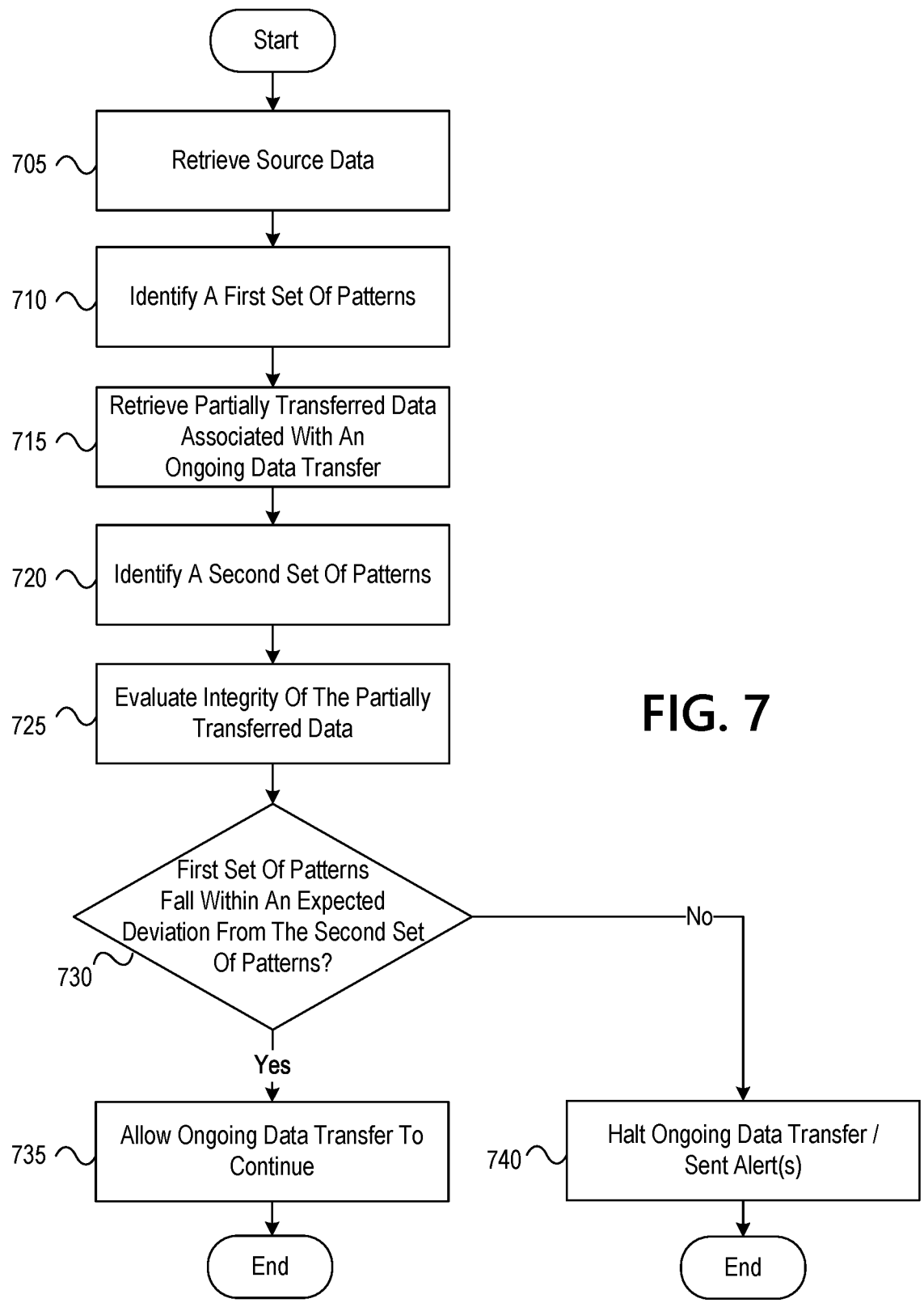

FIG. 7 depicts an illustrative method for data feed meta detail categorization for confidence in accordance with one or more example embodiments. Referring to FIG. 7, at step 705, a computing platform having at least one processor, a communication interface, and memory may retrieve source data from a source system. At step 710, the computing platform may identify a first set of patterns associated with the source data. At step 715, the computing platform may retrieve, from a target system, partially transferred data associated with an ongoing data transfer from the source system to the target system. At step 720, the computing platform may identify a second set of patterns associated with the partially transferred data. At step 725, the computing platform may evaluate integrity of the partially transferred data by comparing the first set of patterns associated with the source data, with the second set of patterns associated with the partially transferred data. At step 730, the computing platform may detect whether the first set of patterns falls within an expected deviation from the second set of patterns based on the comparing of the first set of patterns associated with the source data, with the second set of patterns associated with the partially transferred data. At step 735, based on detecting that the first set of patterns falls within the expected deviation from the second set of patterns, the computing platform may allow the ongoing data transfer from the source system to the target system to continue. At step 740, based on detecting that the first set of patterns falls outside the expected deviation from the second set of patterns, the computing platform may halt the ongoing data transfer from the source system to the target system and/or send one or more notifications or alerts.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
 initiate a data transfer from a source system to a target system;
 retrieve, via the communication interface, source data from the source system wherein the source data includes structured and unstructured data;
 identify a first set of patterns associated with the source data, identifying the first set of patterns associated with the source data including identifying categories of structure patterns in the source data by evaluating fields within the source data against a list of common patterns to identify a category of a respective field;
 retrieve, via the communication interface, from the target system and as data is moving from the source system to the target system during the initiated data transfer, partially transferred data associated with an ongoing data transfer from the source system to the target system;
 identify a second set of patterns associated with the partially transferred data;
 evaluate integrity of the partially transferred data by comparing the first set of patterns associated with the source data, with the second set of patterns associated with the partially transferred data, wherein evaluating the integrity of the partially transferred data includes identifying a volume of data transferred to the target system, wherein the volume of data is measured in particular units of storage, and forecasting data patterns in time series data using an exponential smoothing model to capture trends in the volume of data;
 detect whether the first set of patterns falls within an expected deviation from the second set of patterns based on the comparing of the first set of patterns associated with the source data, with the second set of patterns associated with the partially transferred data; and
 halt the ongoing data transfer from the source system to the target system based on detecting that the first set of patterns falls outside the expected deviation from the second set of patterns, wherein halting the ongoing data transfer from the source system to the target system prevents completion of the data transfer from the source system to the target system.

2. The computing platform of claim 1, wherein the memory stores additional computer-readable instructions that, when executed by the at least one processor, cause the computing platform to:
continue the ongoing data transfer from the source system to the target system based on detecting that the first set of patterns falls within the expected deviation from the second set of patterns.

3. The computing platform of claim 1, wherein the memory stores additional computer-readable instructions that, when executed by the at least one processor, cause the computing platform to:
send, via the communication interface, one or more notifications based on detecting that the first set of patterns falls outside the expected deviation from the second set of patterns.

4. The computing platform of claim 3, wherein sending the one or more notifications comprises sending one or more alert messages to a user computing device.

5. The computing platform of claim 1, wherein identifying the first set of patterns in the source data further comprises identifying one or more types of data in each field.

6. The computing platform of claim 1, wherein identifying the first set of patterns in the source data further comprises extracting a histogram identifying frequency of occurrence of different types of data in each field.

7. The computing platform of claim 1, wherein identifying the first set of patterns associated with the source data further comprises identifying patterns in the unstructured data.

8. The computing platform of claim 1, wherein retrieving the source data from the source system comprises retrieving source data from an enterprise computing system.

9. The computing platform of claim 1, wherein retrieving the source data from the source system comprises retrieving source data from a third party computing system.

10. The computing platform of claim 1, wherein the memory stores additional computer-readable instructions that, when executed by the at least one processor, cause the computing platform to:
train the exponential smoothing model based on historical data; and
evaluate integrity of the partially transferred data based on the trained exponential smoothing model.

11. A method, comprising:
at a computing platform comprising at least one processor, a communication interface, and memory:
 initiating a data transfer from a source system to a target system;
 retrieving, by the at least one processor, via the communication interface, source data from the source system, wherein the source data includes structured and unstructured data;
 identifying, by the at least one processor, a first set of patterns associated with the source data, identifying the first set of patterns associated with the source data including identifying categories of structure patterns in the source data by evaluating fields within the source data against a list of common patterns to identify a category of a respective field;
 retrieving, by the at least one processor, via the communication interface, from the target system and as data is moving from the source system to the target system during the initiated data transfer, partially transferred data associated with an ongoing data transfer from the source system to the target system;
 identifying, by the at least one processor, a second set of patterns associated with the partially transferred data;
 evaluating, by the at least one processor, integrity of the partially transferred data by comparing the first set of patterns associated with the source data, with the second set of patterns associated with the partially transferred data, wherein evaluating the integrity of the partially transferred data includes identifying a volume of data transferred to the target system, wherein the volume of data is measured in particular units of storage, and forecasting data patterns in time series data using an exponential smoothing model to capture trends in the volume of data;

detecting, by the at least one processor, whether the first set of patterns falls within an expected deviation from the second set of patterns based on the comparing of the first set of patterns associated with the source data, with the second set of patterns associated with the partially transferred data; and halting, by the at least one processor, the ongoing data transfer from the source system to the target system based on detecting that the first set of patterns falls outside the expected deviation from the second set of patterns, wherein halting the ongoing data transfer from the source system to the target system prevents completion of the data transfer from the source system to the target system.

12. The method of claim 11, wherein the memory stores additional computer-readable instructions that, when executed by the at least one processor, cause the computing platform to:

sending, by the at least one processor, via the communication interface, one or more notifications based on detecting that the first set of patterns falls outside the expected deviation from the second set of patterns.

13. The method of claim 11, wherein identifying the first set of patterns in the source data further comprises identifying one or more types of data in each field.

14. The method of claim 11, wherein identifying the first set of patterns associated with the source data further comprises identifying patterns in the unstructured data.

15. The method of claim 11, further comprising:

training, by the at least one processor, the exponential smoothing model based on historical data; and evaluating, by the at least one processor, integrity of the partially transferred data based on the trained exponential smoothing model.

16. One or more non-transitory computer-readable media storing instructions that, when executed by a computing platform comprising at least one processor, a communication interface, and memory, cause the computing platform to:

initiate a data transfer from a source system to a target system;

retrieve, via the communication interface, source data from the source system, wherein the source data includes structured and unstructured data;

identify a first set of patterns associated with the source data, identifying the first set of patterns associated with the source data including identifying categories of structure patterns in the source data by evaluating fields within the source data against a list of common patterns to identify a category of a respective field;

retrieve, via the communication interface, from the target system and as data is moving from the source system to the target system during the initiate data transfer, partially transferred data associated with an ongoing data transfer from the source system to the target system;

identify a second set of patterns associated with the partially transferred data;

evaluate integrity of the partially transferred data by comparing the first set of patterns associated with the source data, with the second set of patterns associated with the partially transferred data, wherein evaluating the integrity of the partially transferred data includes identifying a volume of data transferred to the target system, wherein the volume of data is measured in particular units of storage, and forecasting data patterns in time series data using an exponential smoothing model to capture trends in the volume of data;

detect whether the first set of patterns falls within an expected deviation from the second set of patterns based on the comparing of the first set of patterns associated with the source data, with the second set of patterns associated with the partially transferred data; and halt the ongoing data transfer from the source system to the target system based on detecting that the first set of patterns falls outside the expected deviation from the second set of patterns, wherein halting the ongoing data transfer from the source system to the target system prevents completion of the data transfer from the source system to the target system.

* * * * *